United States Patent
Nishida

(10) Patent No.: US 7,879,277 B2
(45) Date of Patent: Feb. 1, 2011

(54) METHOD FOR FORMING HOLLOW MOLDINGS HAVING THIN FILM ON INNER SURFACE

(75) Inventor: Shoso Nishida, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 12/467,582

(22) Filed: May 18, 2009

(65) Prior Publication Data

US 2009/0218716 A1 Sep. 3, 2009

Related U.S. Application Data

(62) Division of application No. 11/529,406, filed on Sep. 29, 2006, now Pat. No. 7,744,361.

(30) Foreign Application Priority Data

May 26, 2005 (JP) .......................... P2005-153273

(51) Int. Cl.
*B29C 45/14* (2006.01)

(52) U.S. Cl. .................. 264/250; 264/255; 264/267; 264/263; 264/328.7; 264/328.8; 264/328.11

(58) Field of Classification Search ................ None
See application file for complete search history.

(56) References Cited

U.S. PATENT DOCUMENTS

| | | | |
|---|---|---|---|
| 3,463,663 A * | 8/1969 | Chopra | 428/469 |
| 3,804,039 A * | 4/1974 | Streel | 118/726 |
| 5,413,743 A * | 5/1995 | Prophet | 264/1.7 |
| 6,042,364 A | 3/2000 | Nishida | |
| 6,210,619 B1 * | 4/2001 | Owens | 264/255 |
| 6,428,730 B1 * | 8/2002 | Nishida | 264/255 |
| 7,604,764 B2 * | 10/2009 | Arai et al. | 264/263 |

FOREIGN PATENT DOCUMENTS

| | | |
|---|---|---|
| JP | 2-38377 B2 | 8/1990 |
| JP | 3047213 B2 | 3/2000 |
| JP | 3326752 B2 | 7/2002 |
| JP | 2004-136532 A | 5/2004 |
| JP | 2004-338328 A | 12/2004 |
| JP | 2006-224449 A | 8/2006 |

OTHER PUBLICATIONS

Japanese Office Action dated Feb. 15, 2008.

(Continued)

*Primary Examiner*—Edmund H. Lee
(74) *Attorney, Agent, or Firm*—Sughrue Mion, PLLC

(57) ABSTRACT

The method employs a stationary mold having depositing recesses equipped in its inside with a deposition element such as a target electrode, and movable molds made slidable. A primary molding is performed to form a body portion and a cover member to have joint portions around their opening. The body portion left in the vertically sliding mold is deposited after it was densely covered with the depositing recesses. Next, the deposited body portion and the cover member, as left in the molds, are registered and mold clamped, and the molten metal is injected to integrated the joint portions.

9 Claims, 4 Drawing Sheets

OTHER PUBLICATIONS

Korean Office Action dated Sep. 28, 2007 for Application No. 10-2006-0093611.

Chinese Office Action dated Jul. 3, 2009.

Chinese Office Action issued in Application No. 200610141514.4, dated Dec. 11, 2009.

German Office Action issued in corresponding German Application No. 10 2006 044 933.9, issued on Sep. 22, 2010.

* cited by examiner

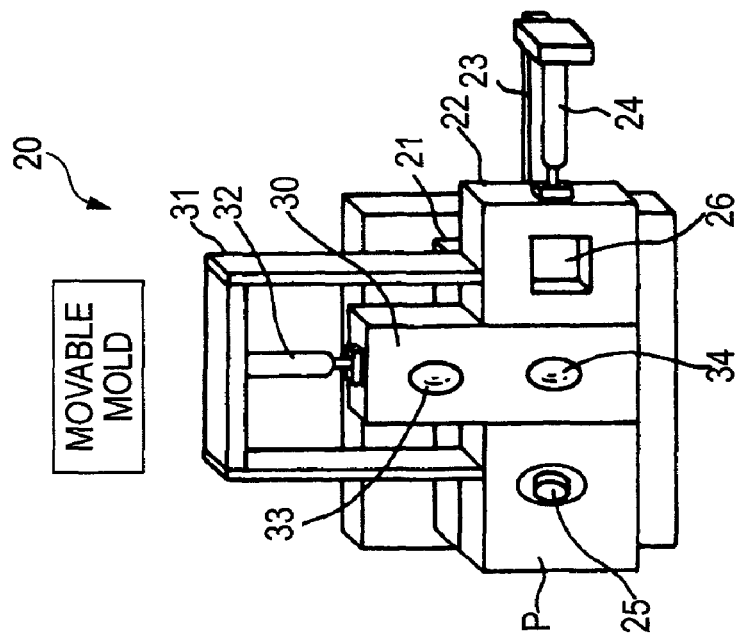
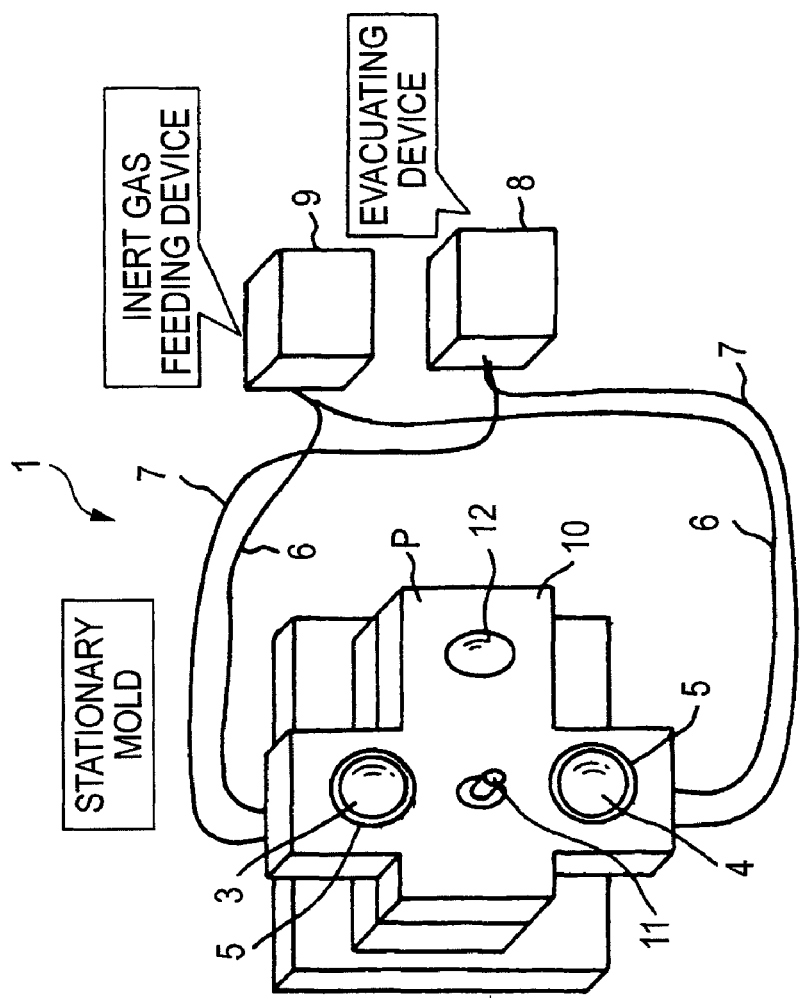

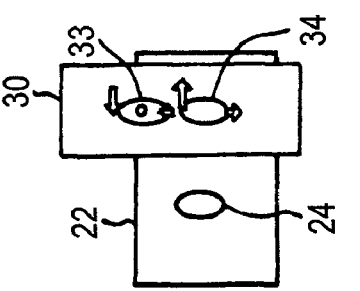
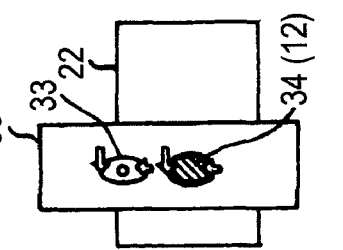
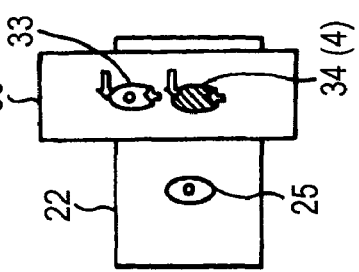
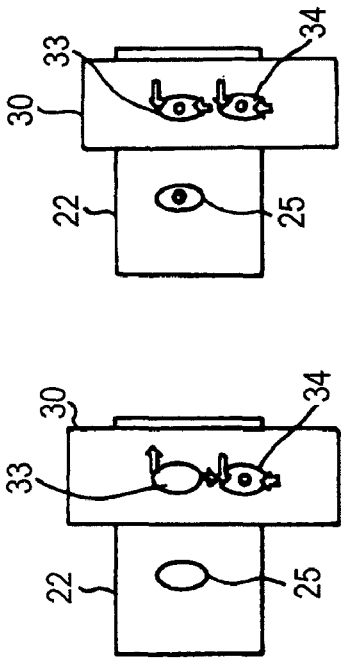
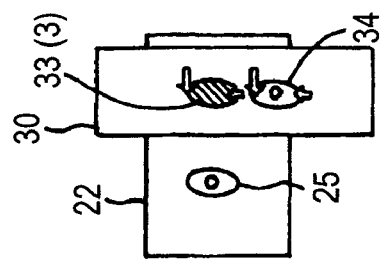
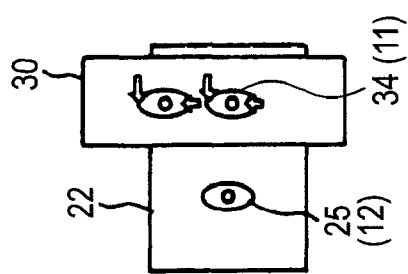
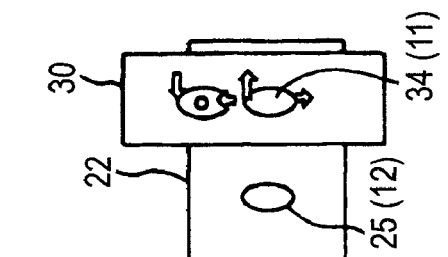
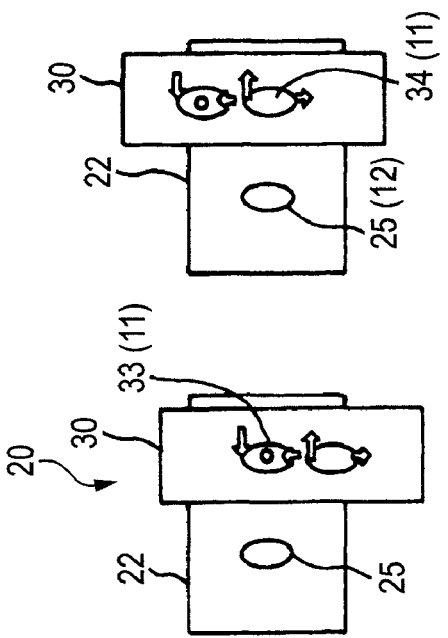
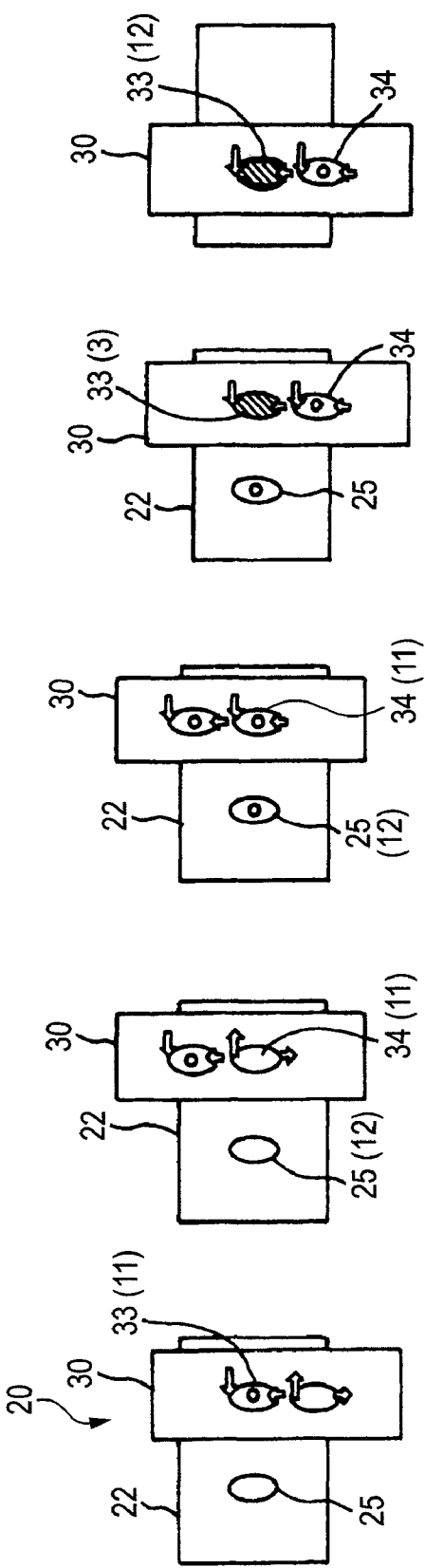

METHOD FOR FORMING HOLLOW MOLDINGS HAVING THIN FILM ON INNER SURFACE

This is a divisional of application Ser. No. 11/529,406 filed Sep. 29, 2006, now U.S. Pat. No. 7,744,361, which is based on Japanese Patent Application No. 2005-153273. The entire disclosure of the prior application, application Ser. No. 11/529,406, is hereby incorporated by reference.

This application is based on Japanese Patent Application No. 2005-153273, which is incorporated herein by reference.

BACKGROUND OF THE INVENTION

1. Field of the Invention

The present invention relates to a method for forming a hollow molding integrated by jointing openings of a pair of semi-hollow bodies and having a thin film deposited on the inner surface of at least one semi-hollow body, and a molding apparatus to be employed for executing the molding method.

2. Description of the Related Art

A molding having a thin film of several micron orders partially on the inner surface of a hollow body is exemplified by a front lamp or a tail lamp, which is attached to a vehicle. This lamp is composed of a recessed body portion having an electric bulb, and a lens unit integrally attached to the opening of the body portion. The body portion is molded by an injection molding method, for example, and is suspended in a deposition-dedicated vacuum tank by means of a dedicated hanger while its unnecessary portion such as an outer surface being masked. The body portion is then formed with a thin film by the later-described deposition method. The body portion is set again in a mold and is registered with a lens portion molded separately so that they are jointed and integrated by an injection molding method.

The deposition method for forming a thin film on the surface of a substrate such as the body portion is known in the art. There are known: the sputtering method, in which the thin film is formed by arranging the substrate and the target in a confronting manner and by applying and discharging a negative voltage of several KV to the target in an argon gas atmosphere of several Pa to several tens Pa; the vacuum deposition method, in which the film is formed by housing the substrate and the evaporation source in a vacuum container; the ion plating method, in which the vacuum deposition is performed in an argon gas under a pressure of several Pa by applying a negative voltage of several KV to the substrate; and the chemical deposition method.

JP-B-2-38377 discloses a method for forming a hollow molding by an injection molding. Specifically, the hollow molding forming method includes: a primary molding, in which a pair of primary semi-moldings are so formed by a pair of cavities formed by the stationary mold and the slide mold as to have a joint portion around their opening; and a secondary molding, in which the molds are opened so that one primary semi-molding is left on the stationary mold whereas the other primary semi-molding is left on the slide mode, in which the slide mold is slid to the position where the joint portions of the paired primary semi-molding are registered, in which the molds are then mold clamped, and the joint portions are jointed by injecting the molten resin thereto. Moreover, Japanese Patent No. 3,326,752 discloses such one of the molding method of JP-B-2-38377, that a guide portion is integrally formed at the primary molding time on the inner side of the joint portion or the abutting portion of one primary semi-molding, and that the abutting portion of the other primary semi-molding is guided for the secondary molding, when it is fitted on the abutting portion of one primary semi-molding, by the guide portion of the abutting portion of the one primary semi-molding. On the other hand, Japanese Patent No. 3,047,213 discloses a molding method, in which the hollow molding is formed as described above, by injecting and filling the resin so that the angle made by the abutting portion from the injecting and filling point at the secondary molding time may be 90 degrees or less.

According to the forming methods described above, there arise many problems because the substrate has to be formed in advance by the injection molding method and has to be transferred into the vacuum tank for the deposition. For example, the substrate is molded in advance and is stored. Therefore, the substrate may be soiled on its surface with hand or dust while being stored, so that it may cause a deposition failure. In order to avoid this, the handling of the substrate requires the highest care and raises the cost. Further, the prefabricated substrate is once stored so that its storage raises a management problem. In addition, the substrate has to be once extracted from the mold before it is deposited, and has to be again inserted into the mold before it is jointed, thus lowering the productivity.

On the other hand, the injection molding method disclosed in JP-B-2-38377, is advantageous not only in that the individual steps can be automated to mass-produce the hollow moldings but also in that even the hollow moldings of complicated shapes can be manufactured. According to the invention of Japanese Patent No. 3,326,752, on the other hand, even with more or less deformations, the abutting portions can be brought into fine abutment thereby to raise an effect that the resin for the secondary molding has no leakage. Moreover, the invention of Japanese Patent No. 3,047,213 is characterized in that its joint strength is so high that the molten resin for the secondary molding can be molded even with less injection portions. Thus, these inventions are effectively practiced still at this time. The molding methods of the related art, however, cannot form the thin film of the order of several microns on the inner surface of the hollow molding.

SUMMARY OF THE INVENTION

The present invention contemplates to provide a molding method having solved the aforementioned problems of the related art, and has an object to provide a method for forming a hollow molding having a thin film on its inner surface, which has any deposited face contamination so that its quality is not deteriorated by the deposition failure, which does not need any special storage management, and which can be automatically molded with ease, and a molding apparatus to be used for practicing that molding method.

In order to achieve the above-specified object, according to the invention, while the inner surface of the body portion molded by a stationary mold and a movable mold made slidable is being left in the recess of the movable mold, the body portion is covered with a depositing chamber having a deposition element such as a target electrode, a substrate electrode or a vacuum suction pipe therein so that the deposition is performed in the mold.

In order to achieve the above-specified object, according to a first aspect of the invention, there is provided a method for forming a hollow molding having a thin film on its inner surface, comprising: a primary molding comprising: molding a pair of semi-hollow bodies by using a stationary mold and a slidable movable mold; a depositioning comprising: driving the slidable movable mold to a predetermined position while leaving the paired hollow bodies molded at the primary molding in their individual molds; and depositing the inner surface of at least one of the paired semi-hollow bodies while being covered with a depositing recess which is formed in the stationary mold and includes therein a deposition element comprising a target electrode, a substrate electrode and a vacuum suction pipe; and a secondary molding comprising: driving the slidable movable mold to the position, where the opening of the paired semi-hollow bodies registers, while the paired semi-hollow bodies, at least one of which is deposited, being left in the individual molds; mold clamping the slidable movable mold; and injecting a molten resin to joint portions of the semi-hollow bodies so as to integrate the paired semi-hollow bodies. According to a second aspect of the invention, there is provided a method for simultaneously forming a plurality of hollow moldings each having a thin film on its inner surface, comprising: a primary molding comprising: molding a plurality of pairs of semi-hollow bodies by using a stationary mold and a slidable movable mold; a depositioning comprising: driving the slidable movable mold to a predetermined position while leaving the plurality of pairs of hollow bodies molded at the primary molding in their individual molds; and depositing the inner surface of at least one of the paired semi-hollow bodies while being covered with a depositing recess which is formed in the stationary mold and includes therein a deposition element comprising a target electrode, a substrate electrode and a vacuum suction pipe; and a secondary molding comprising: driving the slidable movable mold to the position, where the openings of the plurality of pairs of semi-hollow bodies register, while the plurality of pairs of semi-hollow bodies, at least one of which is deposited, being left in the individual molds; mold clamping the slidable movable mold; and injecting a molten resin to joint portions of the semi-hollow bodies so as to integrate the plurality of pairs of semi-hollow bodies. According to a third aspect of the invention, the semi-hollow bodies to be paired at the primary molding are molded of individually different resin materials.

According to a fourth aspect of the invention, there is provided a molding apparatus for forming a hollow molding integrated by jointing a pair of semi-hollow bodies around an opening and having a thin film on the inner surface of at least one of the semi-hollow bodies, comprising: a stationary mold comprising: a core and a recess for molding the paired semi-hollow bodies; and a first depositing recess and a second depositing recess disposed at a predetermined spacing and including a deposition element comprising a target electrode, a substrate electrode and a vacuum suction pipe; and a movable mold comprising: a horizontally sliding mold having a core coactive with the recess of the stationary mold; and a vertically sliding mold having a first recess and a second recess coactive with the core of the stationary mold, the first depositing recess and the second depositing recess being sized to cover the first recess and the second recess disposed in the vertically sliding mold, respectively. According to a fifth aspect of the invention, there is provided a molding apparatus for simultaneously forming a plurality of pairs of hollow moldings integrated by jointing pairing semi-hollow bodies around an opening and each having a thin film on the inner surface of at least one of the semi-hollow bodies, comprising: a stationary mold comprising: a plurality of cores and a plurality of recesses for molding the paired semi-hollow bodies; and a first depositing recess and a second depositing recesses disposed at a predetermined spacing and including a deposition element comprising a target electrode, a substrate electrode and a vacuum suction pipe; and a movable mold comprising: a horizontally sliding mold (having a plurality of cores individually coactive with a plurality of recesses of the stationary mold; and a vertically sliding mold having a first recess and a second recess individually coactive with the core of the stationary mold, and the first depositing recess and the second depositing recess being sized to cover the first recess and the second recess disposed in the vertically sliding mold, respectively.

Thus, according to the invention, a pair of semi-hollow bodies are molded by using a stationary mold and a slidable movable mold, and the slidable movable mold is driven to a predetermined position while leaving the paired hollow bodies molded at the primary molding step, in their individual molds, to deposit the inner surface of at least one of the paired semi-hollow bodies while being covered with a depositing recess formed in the stationary mold and having a deposition element such as a target electrode, a substrate electrode or a vacuum suction pipe. In short, the paired semi-hollow bodies are not taken out from the mold but are deposited in the mold while being covered with the depositing recess, so that the deposited face is not soiled on its surface with hand or dust. It is, therefore, possible to provide a hollow molding of an excellent deposited quality having the thin film on its inner surface. Moreover, the deposition is performed in the mold while the semi-hollow bodies are left in the mold, so that the semi-hollow bodies need no storage management. According to the invention, moreover, the slidable movable mold is driven to the position, where the opening of the paired semi-hollow bodies registers, while the paired semi-hollow bodies, at least one of which is deposited, being left in the individual molds, thereby to mold clamp the slidable movable mold, so that the paired semi-hollow bodies are integrated by injecting a molten resin to their joint portions. By using the molds, even the hollow molding of a complicated shape having the thin film on its inner surface can be automatically formed with ease.

According to another invention, on the other hand, a plurality of pairs of semi-hollow bodies are molded by the primary molding step, and the inner surface of at least one of the paired semi-hollow bodies even pairing at the deposition step is deposited, and the paired semi-hollow bodies at the secondary molding step are integrated. In addition to the effects thus far described, the plurality of hollow moldings each having the thin film on its inner surface can be simultaneously produced to improve the molding efficiently.

BRIEF DESCRIPTION OF THE DRAWINGS

FIGS. 1A and 1B are diagrams showing a molding apparatus according to a first embodiment of the invention and presenting schematic perspective views A and B of a stationary mold and a movable mold, respectively, from the side of a parting line;

FIGS. 2A to 2J are diagrams showing the molding apparatus according to the first embodiment and presenting top plan views A to J of individual molding steps schematically.

DETAILED DESCRIPTION OF THE PREFERRED EMBODIMENTS

Figure 3A:
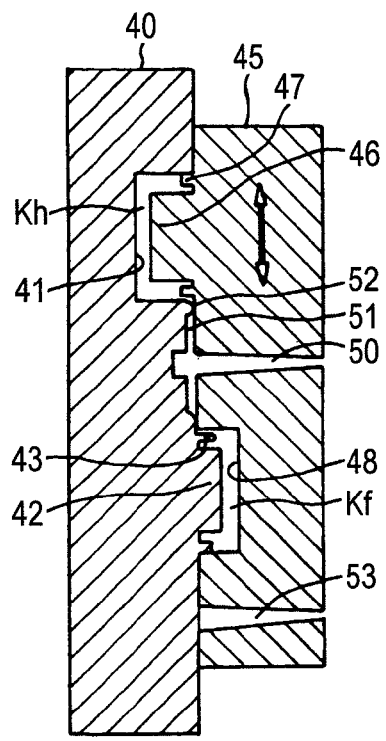
FIGS. 3A to 3D are diagrams showing examples of the molds for explaining the working principle of the invention and presenting sectional views A to D of the individual molding steps schematically.

Here is described a molding example of a molding article having a thin film in its inside, which is formed by injection-molding a cup-shaped body portion and a plate-shaped cover member for sealing the opening of the body portion, by forming the thin film on the inner surface of the body portion in the mold, and by sealing the opening of the body portion with the cover member. An embodiment of a molding apparatus of the invention is described at first. FIG. 1 presents perspective views schematically showing the molding apparatus according to an embodiment of the invention. FIG. 1A is a perspective view of a stationary mold 1, as taken from a parting line side, and FIG. 1B is also a perspective view of a movable mold 20, as taken from the parting line side. In the shown embodiment, the stationary mold 1 has a parting line face P formed into a generally cross shape of a first vertically extending molding face 2 and a second horizontally extending molding face 10.

In the first molding face 2, first and second depositing recesses 3 and 4 for forming a vacuum chamber are formed at a vertically predetermined spacing. These depositing recesses 3 and 4 are so sized as to cover the later-described body molding recesses, and are provided therearound with O-rings 5. When the depositions are made by the sputtering method, for example, deposition elements such as target electrodes or substrate electrodes are disposed in the depositing recesses 3 and 4 thus formed, or vacuum suction pipes or argon gas feeding pipes are opened in the depositing recesses 3 and 4. Moreover, the openings of those electrodes or vacuum suction pipes are connected at their openings to an evacuating device 8, an inert gas feeding device 9 or a not-shown power source device through hoses 6 and 7.

The second molding face 10 in the horizontal direction is provided, at its position to register with the first and second depositing recesses 3 and 4, with a body molding core 11 for molding the cup-shaped body portion. The second molding face 10 is further provided, as spaced at a predetermined distance from the body molding core 11, with a cover member molding recess 12 for molding the cover member. The body molding core 11 protrudes outward from the parting line face P. As a result, the body portion is formed into a cup shape. On the other hand, the cover member molding recess 12 is slightly recessed from the parting line face P. As a result, a plate-shaped cover member is molded. Around this core 11, although not shown in FIG. 1, there is formed a bulge for molding such a joint portion integrally with the body portion as will be described in detail with reference to FIG. 3.

The movable mold 20 is composed of a horizontally sliding mold 22 so attached to a movable frame 21 as can be horizontally slid, and a vertically sliding mold 30 so attached to the horizontally sliding mold 22 as can be vertically slid. These molds 22 and 30 have their parting line faces P formed in a common plate. In the embodiment shown in FIG. 1B, therefore, the horizontally sliding mold 22 is horizontally divided so that the vertically sliding mold 30 slides vertically of FIG. 1B between the divided portions. The horizontally sliding mold 22 thus formed is horizontally driven integrally with the vertically sliding mold 30 by an actuator 24 which has its one end portion attached to a support member 23 horizontally extending from the movable frame 21. On the other hand, the vertically sliding mold 30 is vertically driven independently of the horizontally sliding mold 22 by an actuator 32 which has its one portion attached to a vertically extending gate-shaped support member 31.

A cover member molding core 25 for forming the cover member is formed on such one side of the parting line face P of the horizontally sliding mold 22 of the movable mold 20 thus formed as crosses the vertically sliding mold 30, and a clearance recess 26 for clearing the body molding core 11 when mold clamped is formed on the other side. Around the cover member molding core 25, like the body molding core 11, there is also formed the bulge for molding the joint portion integrally with the cover member, although not shown in FIG. 1B. In the parting line face P of the vertically sliding mold 30, there are formed first and second body molding recesses 33 and 34, which correspond to the first and second depositing recesses 3 and 4 formed in the stationary mold 1.

The stationary mold 1 and the movable mold 20 thus far described can be used to form the cup-shaped body portion and the plate-shaped cover member by the primary molding operation, and the body portion and the cover member can be integrated to form the hollow molding by the secondary molding operation. An example of the mold for explaining this molding principle is specifically shown in FIG. 3. Specifically, this mold is composed of a stationary mold 40 and a slide mold 45, and a body molding recess 41 of a predetermined depth for molding the body is formed at an upper position in the parting line face P of the stationary mold 40, whereas a cover member molding core 42 of a relatively small height is formed at a lower position. A small core 43 is formed around and at a predetermined spacing from that core 42. The small core 43 forms a jointing step portion around the opening of the cover member. On the parting line face P of the slide mold 45, on the other hand, there is formed a body molding core 46, which makes pair with the body molding recess 41 of the stationary mold 40. A small core 47 is also formed around and at a predetermined spacing from that core 46. The small core 47 forms a jointing step portion around the opening of the body. Below the body molding core 46, there is formed a shallower cover member molding recess 48, which make pair with the cover member molding core 42 of the stationary mold 40. Between the body molding core 46 and the cover member molding recess 48 of the slide mold 45, there is formed a primary molding sprue 50, which communicates with the body molding recess 41 and the cover member molding recess 48 through a runner 51 and a gate 52. A secondary molding sprue 53 is formed below the primary molding sprue 50. From FIG. 3, there are omitted the actuator for driving the slide mold 45 to slide vertically, the mold clamping device, the ejector device for ejecting the moldings, the injector device and so on.

Figure 3B:
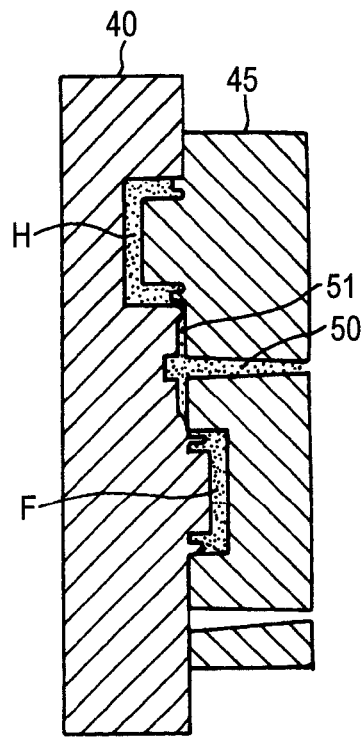
Figure 3C:
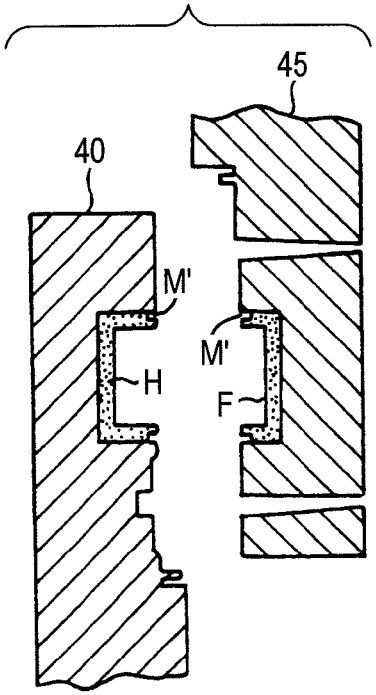

Hollow moldings can be formed by using the aforementioned molds 40 and 45 in the following manner. The molds 40 and 45 are mold clamped at a first position, as shown in FIG. 3A. Then, a body molding cavity Kh is formed by the body molding recess 41 of the stationary mold 40 and the body molding core 46 of the slide mold 45. Moreover, a cover member molding cavity Kf is formed by the cover member molding core 42 of the stationary mold 40 and the cover member molding recess 48 of the slide mold 45. Molten resin is injected from the primary molding sprue 50. Then, the molten resin is poured through the runner 51 and the gate 52 into the body molding cavity Kh and the cover member molding cavity Kf as shown in FIG. 3B. By this primary molding operation, a body H and a cover member F are molded to have a jointing half groove M' around their openings. This half groove M' is shown in FIG. 3C.

Figure 3D:
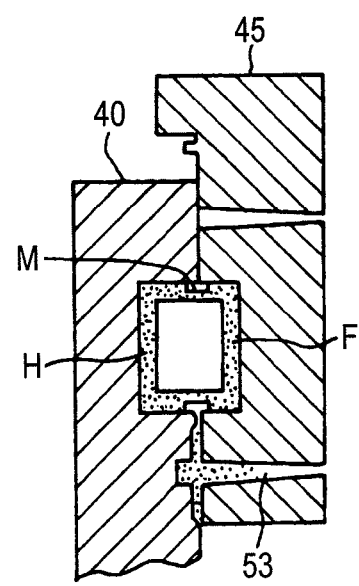

Awaiting the cooled solidification, the mold is opened while the body H being left in the stationary mold 40 and while the cover member F being left in the slide mold 45. Then, the slide mold 45 is slid to the secondary molding position, at which the openings of the body H and the cover member F register with each other. This registering position is shown in FIG. 3C. The molds are mold clamped at the registering position. Then, a jointing cavity M is formed by the half grooves M' and M' at the outer circumference of the abutting portions of the body H and the cover member F, as shown in FIG. 3D. A resin identical to or difference from the body molding resin is injected from the secondary molding sprue 53. By this second molding, the body H and the cover member F are integrated to produce a hollow molding.

The hollow molding having a thin film on its inner surface is also obtained, as described hereinbefore, by molding the body portion and the cover member by the primary molding operation, by forming the thin film either on the inner surface of the body portion or on the inner surface of the body portion and the inner surface of the cover member, and then holding the body portion and the cover member abutting against each other and injecting the molten resin to integrate them by the secondary molding operation. In the aforementioned embodiment shown in FIG. 1, the body molding core 11, the cover member molding core 25, the first and second body molding recesses 33 and 34, the cover member molding recess 12 and so on are also formed to have the shape, as shown in FIG. 3, or the joint portion of the primary molding is made to have a structure, as described in Japanese Patent No. 3,326,752 and Japanese Patent No. 3,047,213, but it is simplified in shape and is schematically shown in FIG. 1.

Referring to schematic FIG. 2, a molding example of a hollow molding having the thin film on the inner surface is described by using the stationary molding 1 and the movable mold 20 of the embodiment shown in FIG. 1. Here in FIG. 2: a blank ellipse indicates an unfilled cavity; an ellipse with a circle indicates a filled-up cavity or a semi-finished molding obtained by the primary molding; a hatched ellipse indicates a semi-finished molding deposited; and a hatched thick ellipse indicates a hollow molding having a deposited inner surface. Moreover, FIG. 2 shows only the slidably driven movable mold 20, but not the fixed stationary mold 1.

The movable mold 20 is slid to a first molding position. Moreover, the vertically sliding mold 30 is slid to the lower first molding position. Then, the first body molding recess 33 of the vertically sliding mold 30 comes into registration with the body molding core 11 of the stationary mold 1 thereby to form a cavity for molding the cup-shaped body portion. The molds are mold clamped, and the molten resin for the primary molding operation is injected. As a result, the first body portion is molded. This state is shown in FIG. 2A.

Awaiting the cooled solidification of some extent, the movable mold 20 is opened, and the vertically sliding mold 30 is driven to an upper second molding position, as shown in FIG. 2B. Then, the cover member molding core 25 of the horizontally sliding mold 22 comes into registration with the cover member molding recess 12 of the stationary mold 1. The second body molding recess 34 of the vertically sliding mold 30 also comes into registration with the body molding core 11 of the stationary mold 1. This registration state is shown in FIG. 2B. The molds are mold clamped. Then, a cavity for molding the cover member is formed by the cover member molding recess 12 of the stationary mold 1 and the cover member molding core 25 of the horizontally sliding mold 22, and a second body molding cavity is also formed by the body molding core 11 and the second body molding recess 34. The first molding molten resin is injected into those cavities. By these primary molding operations, the second body portion and the first cover member are simultaneously molded, as shown in FIG. 2C.

Awaiting the cooled solidification, the movable mold 20 is opened to drive the vertically sliding mold 30 into a lower first deposition position, as shown in FIG. 2D. Then, the first body molding recess 33 of the vertically sliding mold 30 comes into registration with the first depositing recess 3 of the stationary mold 1. Specifically, the first body portion left in the first body molding recess 33 is registered with and confined in the first depositing recess 3. Next, the molds are mold clamped to a depositing extent.

After this mold clamping, the O-ring 5 of the first depositing recess 3 can be brought into close contact with and deposited on the parting line face P of the vertically sliding mold 30. A vacuum source or an inert gas feeding source, for example, is driven to set the inside of the first depositing recess 3 in an argon gas atmosphere of about several to several tens Pa. Then, a negative voltage is applied to the target, and a positive voltage of plus several kV is applied to the body portion, so that argon is discharged and deposited on the inner surface of the body portion. The deposited state is shown in FIG. 2D. The vertically sliding mold 30 is driven to the lefthand secondary molding position, as shown in FIG. 2E. Then, the first body portion, as left in the first body molding recess 33 after the deposition, is registered with the cover member left in the cover member molding recess 12 of the stationary mold 1. The molds are mold clamped, and a molten resin for the second molding operation is injected. As a result, the body portion and the cover member are jointed and integrated at the opening. This state is shown in FIG. 2E. The movable mold 20 is opened to take out the hollow molding having the thin film on the inner surface of the body portion. When the molding is taken out, the first body molding recess 33 of the vertically sliding mold 30 is made cavity, as shown in FIG. 2F.

The molding is taken out, and the molds are mold clamped. Then, a cavity for molding a third body portion is formed by the body molding core 11 and the body molding recess 33, and a cavity for molding a cover member is formed by the cover member molding recess 12 of the stationary mold 1 and the cover member molding core 25 of the horizontally sliding mold 22. The molten resin for the primary molding operation is injected into those cavities. As a result, the third body portion and the second cover member are primarily molded at the same time. The state thus having finished the primary molding operation is shown in FIG. 2G.

The movable mold 20 is opened. The vertically sliding mold 30 is slid to an upper second deposition position. Then, the molds are mold clamped. Thus, the O-ring 5 of the second depositing recess 4 comes into close contact with the parting line face P of the vertically sliding mold 30 so that the preparation is made for the deposition. As described above, the voltage and the gas are applied to the inside of the second deposition so that the deposition is made on the inner circumference of the second body portion. The state thus finished the deposition is shown in FIG. 2H. The vertically sliding mold 30 is driven to the secondary molding position, as shown in FIG. 2I. Thus, the second body portion, as left after the deposition in the second body molding recess 34, comes into registration with the cover member left in the cover member molding recess 12 of the stationary mold 1. The molds are mold clamped, and the molten resin for the secondary molding operation is injected. As a result, the body portion and the cover member are jointed and integrated at the opening. The movable mold 20 is opened to take out the hollow molding having the thin film on the inner surface. The taken-out state is shown in FIG. 2J. Then, the hollow molding having the thin film on the inner surface of the body portion is likewise molded.

Figure 4A:
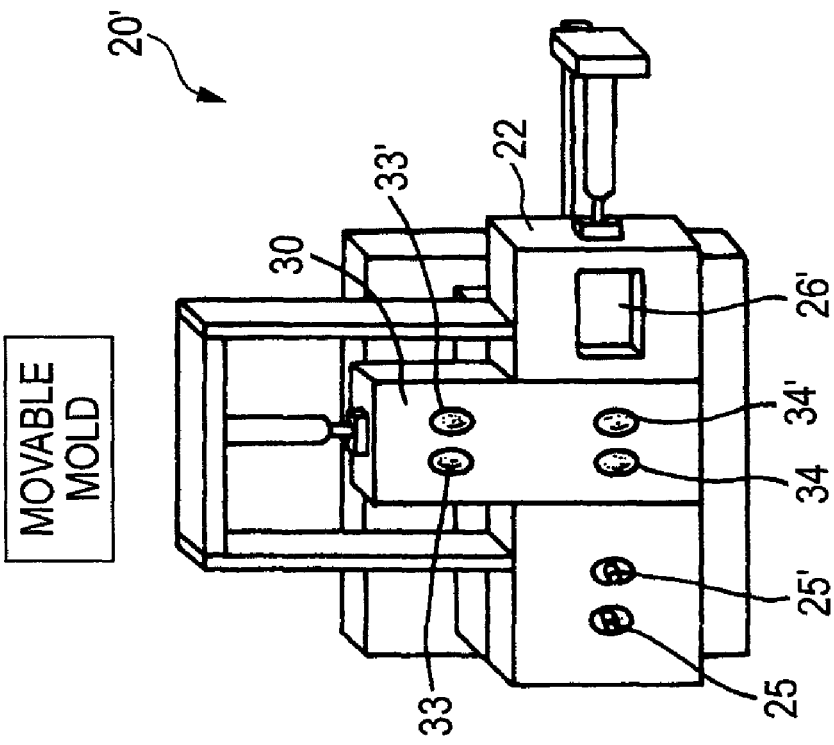
FIGS. 4A and 4B are diagrams showing a molding apparatus according to a second embodiment of the invention and presenting schematic perspective views A and B of a stationary mold and a movable mold, respectively, from the side of a parting line.
Figure 4B:
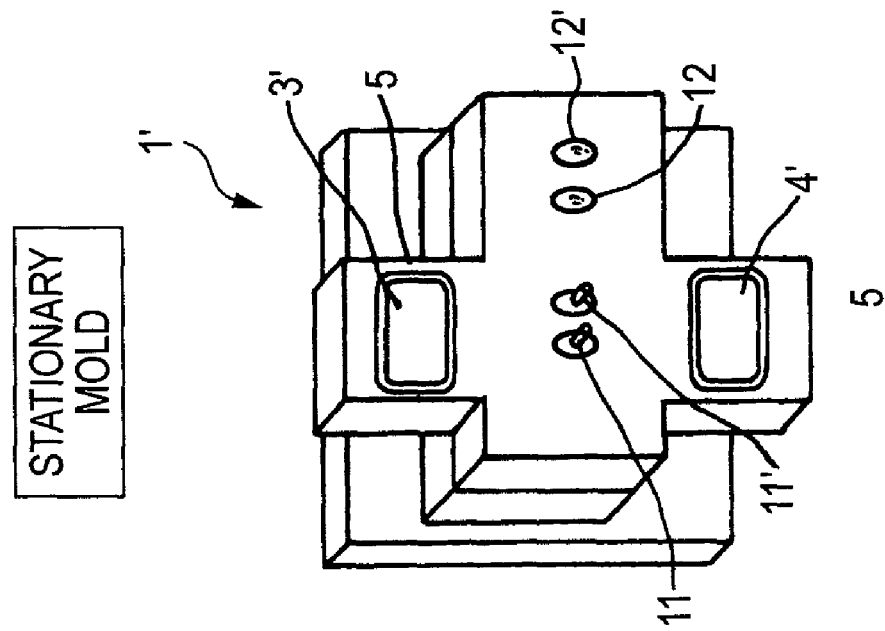

The invention can be practiced in various manners. It is apparent that the inner surface of the cover member can also be deposited, for example, by additionally forming a cover member depositing recess in the stationary mold 1. It is also apparent that two hollow moldings having thin films on their inner surfaces can be concurrently molded if a molding apparatus, as shown in FIG. 4, is used. The description of this embodiment is not made but omitted either by designating the same components of the molding apparatus according to the first embodiment, as shown in FIG. 1, by the common reference numerals, or by dashing the common reference numerals indicating the same components. According to this embodiment, a stationary mold 1' is equipped with two body molding cores 11 and 11' and two cover member molding recesses 12 and 12'. Moreover, the horizontally sliding mold 22 of a movable mold 20' is provided with two cover member cores 25 and 25' and a large relief recess 26' for relieving the body molding cores 11 and 11'. The vertically sliding mold 30 is provided with two first body molding recesses 33 and 33' and two second body molding recesses 34 and 34'. Moreover, first and second depositing recesses 3' and 4' of the stationary mold 1' are so sized as to cover the two first body molding recesses 33 and 33' and the two second body molding recesses 34 and 34' of the vertically sliding mold 30 simultaneously. It is further apparent that three or more hollow moldings having thin films on their inner surfaces can also be produced by increasing the numbers of the body molding cores and the cover member molding recesses. It is also possible to make the body molding resin material and the cover member molding resin material different at the primary molding time. For example, the cover members can also be molded of a transparent lens material, when the hollow moldings having the thin films on their faces are front lamps or tail lamps.

What is claimed is:

1. A method for forming a hollow molding having a thin film on an inner surface, the method comprising:
   molding a first semi-hollow body using a stationary mold and a slidable movable mold, wherein the slidable movable mold is in a first position;
   sliding the slidable movable mold to a second position while leaving the first semi-hollow body in the slidable movable mold; and
   molding a first semi-hollow cover and a second semi-hollow body in the second position using the stationary mold and the slidable movable mold;
   depositing the thin film on an inner surface of the first semi-hollow body while the slidable movable mold is in the second position; and
   sliding the slidable movable mold to a third position, where an opening of the first semi-hollow body registers with an opening of the first semi-hollow cover while the first semi-hollow body and the first semi-hollow cover are left in the slidable movable mold and the stationary mold, respectively;
   mold clamping the slidable movable mold to the stationary mold while the slidable movable mold is in the third position; and
   injecting a molten resin to joint portions of the first semi-hollow body and the first semi-hollow cover so as to integrate the first semi-hollow body and the first semi-hollow cover.

2. The method for forming the hollow molding according to claim 1,
   wherein the semi-hollow bodies to be paired at the primary molding are molded of individually different resin materials.

3. The method according to claim 1, further comprising:
   returning the slidable movable mold to the first position and molding a third semi-hollow body and a second semi-hollow cover;
   depositing the thin film on the second semi-hollow body in the first position;
   sliding the slidable movable mold to a fourth position where an opening of the second semi-hollow body registers with an opening of the second semi-hollow cover while the second semi-hollow body and the second semi-hollow cover are left in the slidable movable mold and the stationary mold, respectively;
   mold clamping the slidable movable mold to the stationary mold while the slidable movable mold is in the fourth position; and
   injecting a molten resin to joint portions of the second semi-hollow body and the second semi-hollow cover so as to integrate the second semi-hollow body and the second semi-hollow cover.

4. The method according to claim 1, wherein the slidable movable mold is provided with a cover molding core, a first body molding recess, and a second body moving recess; and
   wherein the stationary mold is provided with body molding core, a cover molding recess, a first depositing recess, and a second depositing recess.

5. The method according to claim 4, wherein the cover molding core is slidable in a horizontal direction and the first body molding recess and the second body molding recess are slidable in a vertical direction.

6. The method according to claim 4, wherein when the slidable movable mold is in the first position, the first body molding recess on the slidable movable mold is registered with the body core on the stationary mold and the second body molding recess on the slidable movable mold is registered with the second depositing recess.

7. The method according to claim 4, wherein when the slidable movable mold is in the second position, the second body molding recess on the slidable movable mold is registered with the body core on the stationary mold and the first body molding recess on the slidable mold is registered with the first depositing recess.

8. The method according to claim 1, wherein when the slidable movable mold is in the third position, the first body molding recess on the slidable movable mold is registered with the cover member recess on the stationary mold.

9. The method according to claim 3, wherein when the slidable movable mold is in the fourth position, the second body molding recess on the slidable movable mold is reistered with the cover member recess on the stationary mold.

* * * * *